Figure 1:
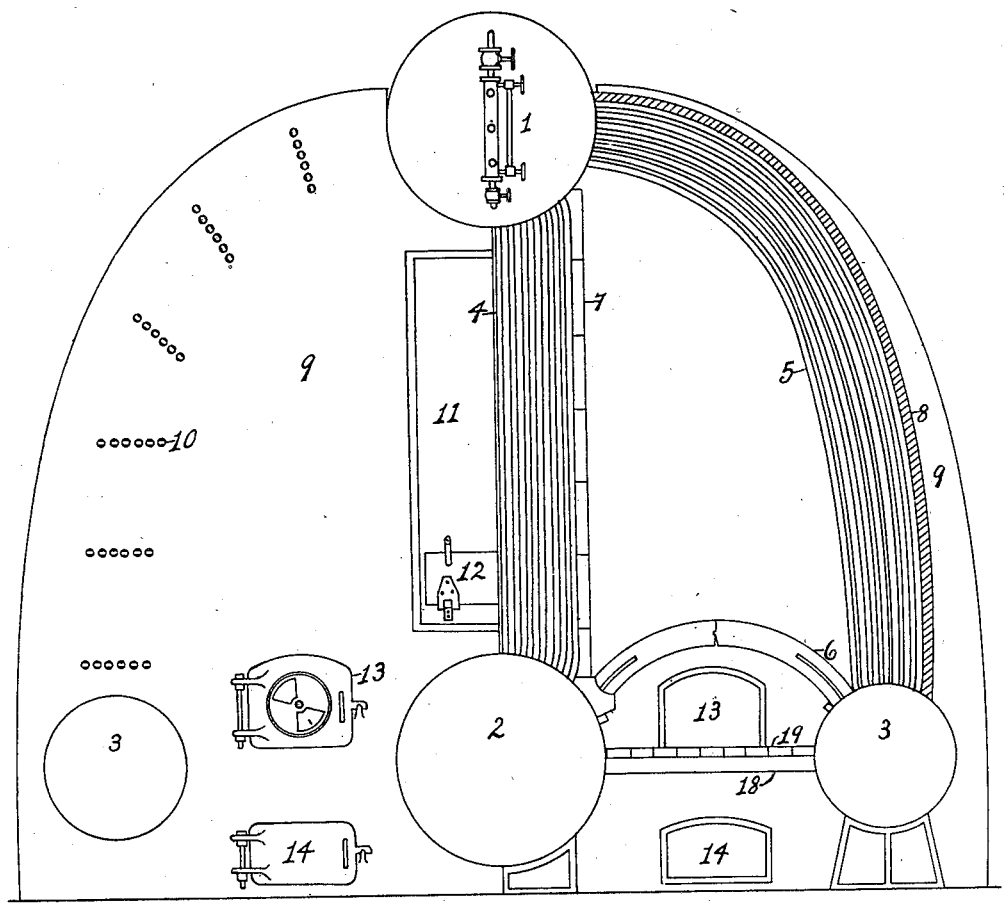

No. 837,392.PATENTED DEC. 4, 1906.
E. F. EDGAR.
STEAM BOILER.
APPLICATION FILED NOV. 10, 1905.

3 SHEETS—SHEET 1.

WITNESSES:
E. B. Edgar.
J B Edgar

INVENTOR
Ellis F Edgar

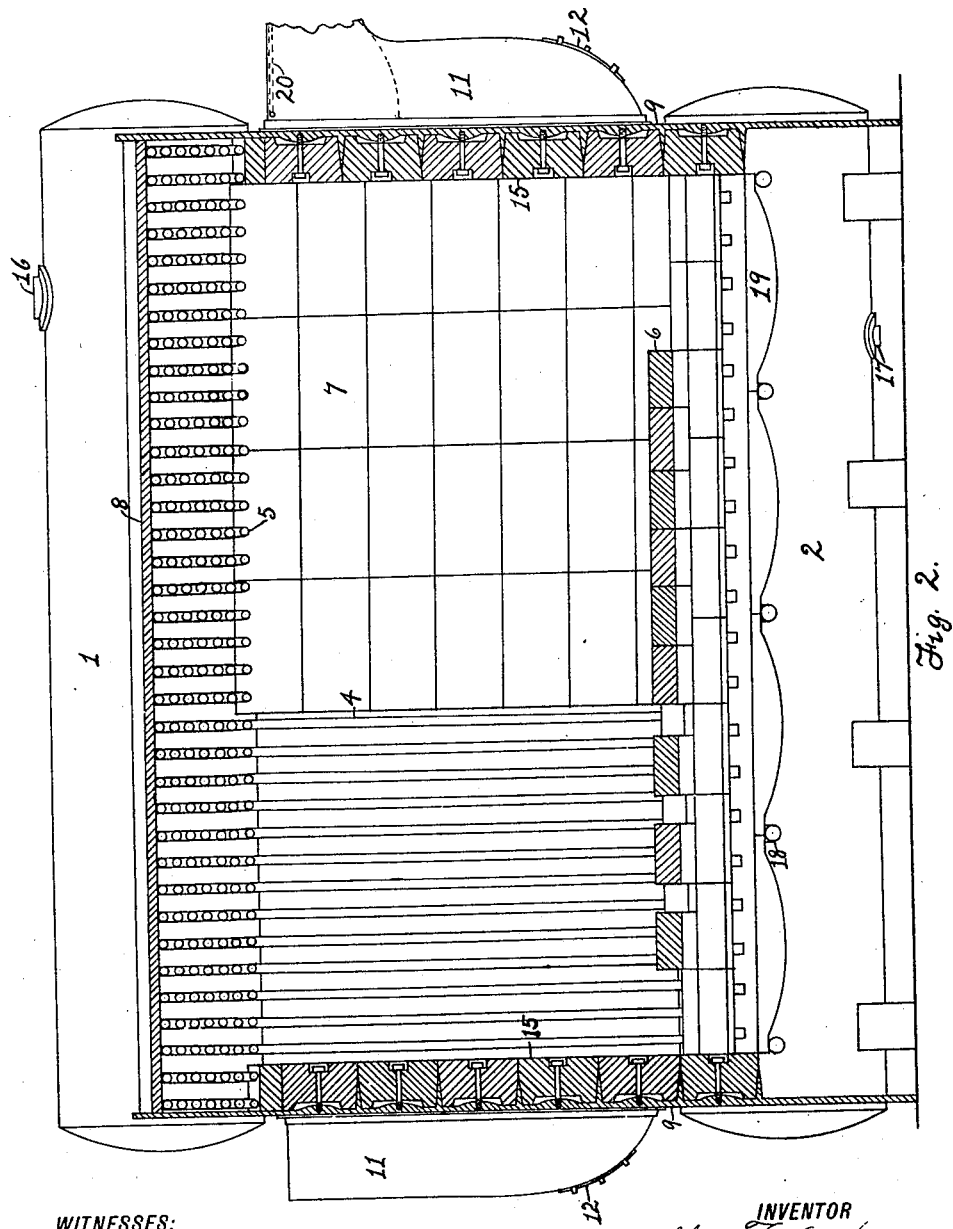

No. 837,392. PATENTED DEC. 4, 1906.
E. F. EDGAR.
STEAM BOILER.
APPLICATION FILED NOV. 10, 1905.
3 SHEETS—SHEET 3.
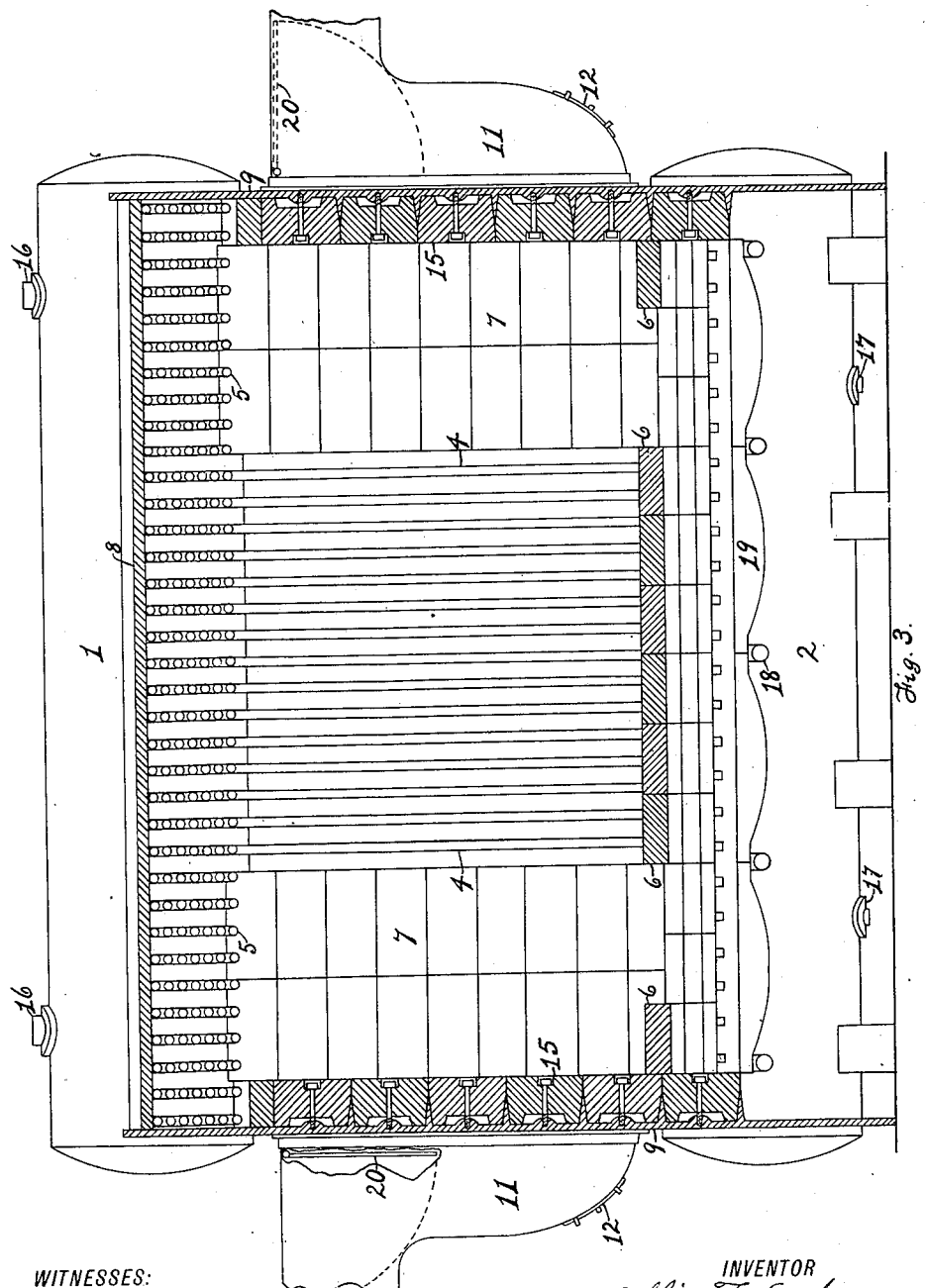
WITNESSES:
E. B. Edgar.
J. B. Edgar
INVENTOR
Ellis F Edgar